United States Patent [19]
Martin

[11] 3,832,968
[45] Sept. 3, 1974

[54] VEHICLE SIGNAL

[76] Inventor: Clifford W. Martin, 2666 S. York St., Denver, Colo. 80210

[22] Filed: Nov. 28, 1973

[21] Appl. No.: 419,666

[52] U.S. Cl.............................. 116/28 R, 73/189
[51] Int. Cl...................................................... B60q
[58] Field of Search............ 116/28 R, 132 R, 63 P; 73/228, 189, 186; 40/39, 37

[56] References Cited
UNITED STATES PATENTS

| | | | |
|---|---|---|---|
| 3,104,548 | 9/1963 | Thompson | 73/186 |
| 3,162,847 | 12/1964 | Huffman | 40/39 X |
| 3,404,566 | 10/1968 | Cordova | 73/228 X |
| 3,686,938 | 8/1972 | Binckley | 73/189 |

*Primary Examiner*—Louis J. Capozi
*Attorney, Agent, or Firm*—Sheridan, Ross & Fields

[57] ABSTRACT

Signal for use on a leading vehicle, indicating to the driver of a trailing vehicle, that the leading vehicle is traveling at or above a predetermined non-hazardous speed or is traveling at a lower hazardous speed or has stopped. It is characterized by a pivoted vane, movable to non-hazardous indicating position by aerodynamic forces, and movable to hazardous indicating position by an opposing spring. The rate at which the viewed area of the vane changes is a measure of the rate of change, or deceleration, of the leading vehicle, thus extending the critical reaction time of a following driver.

16 Claims, 15 Drawing Figures

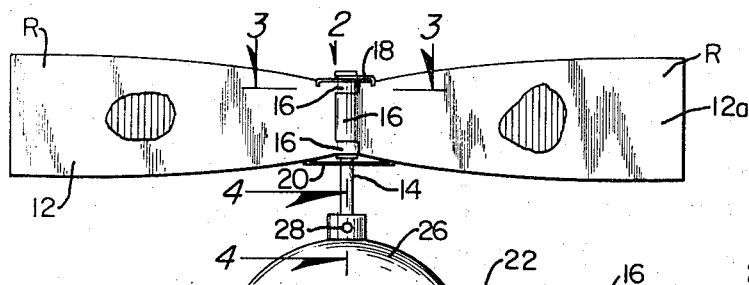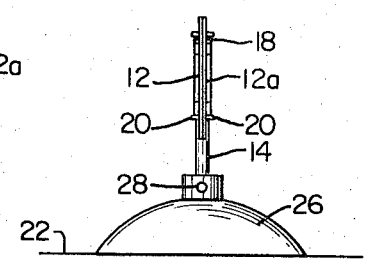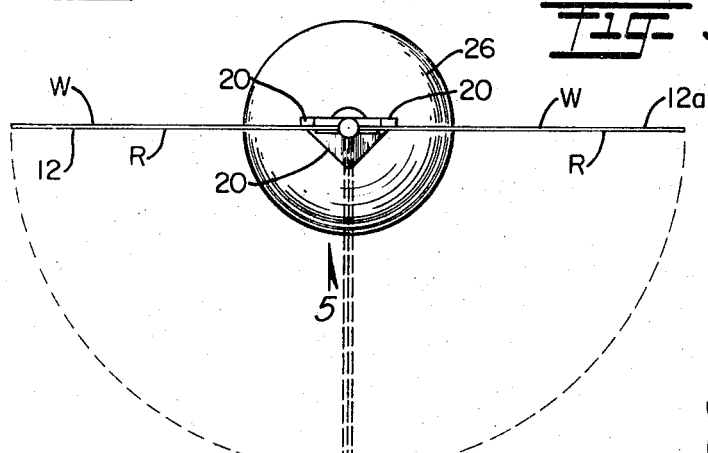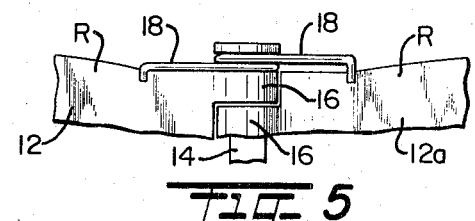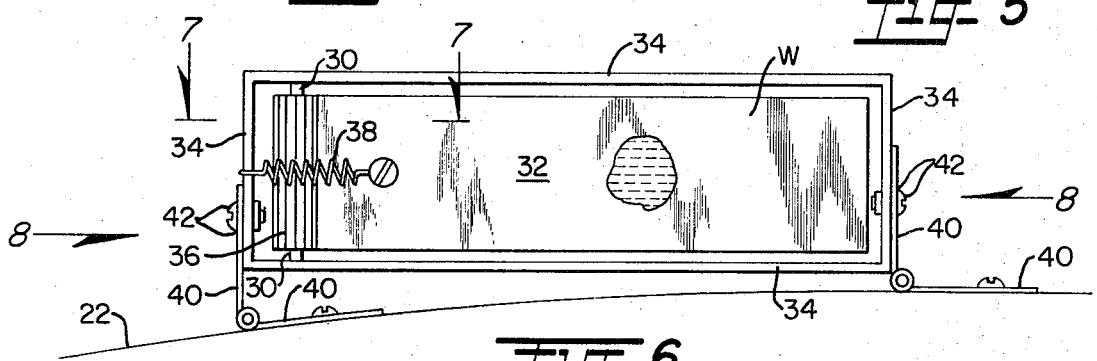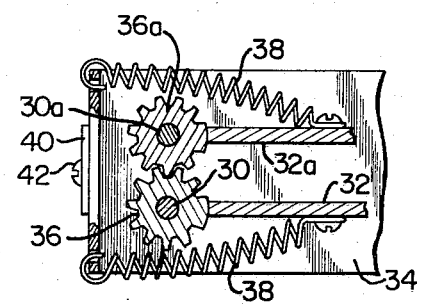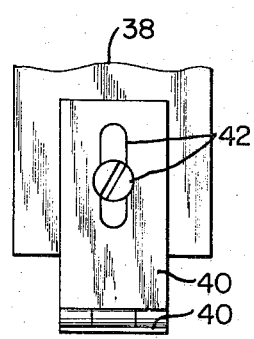

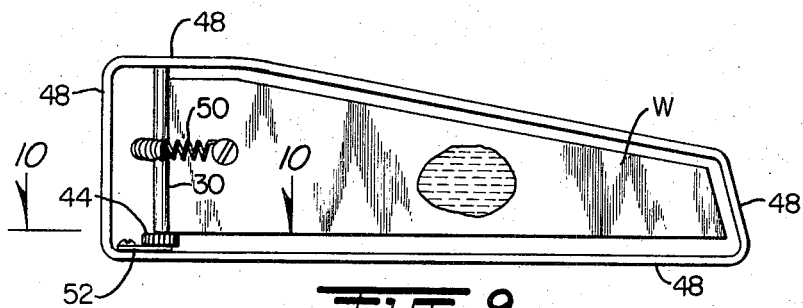
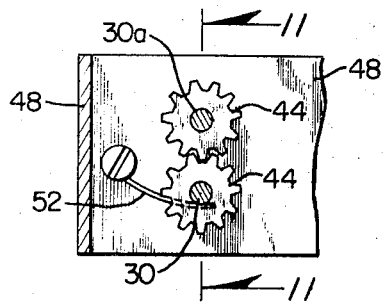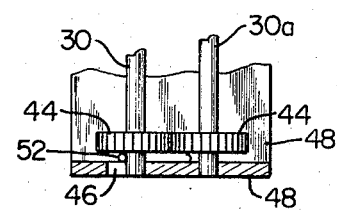
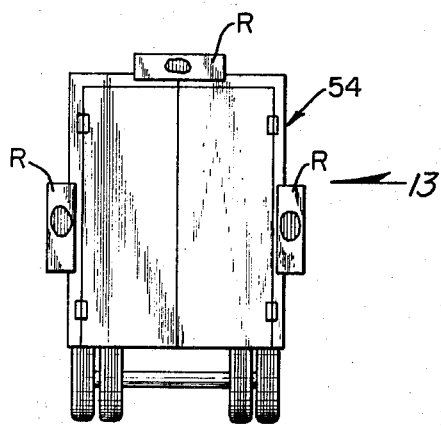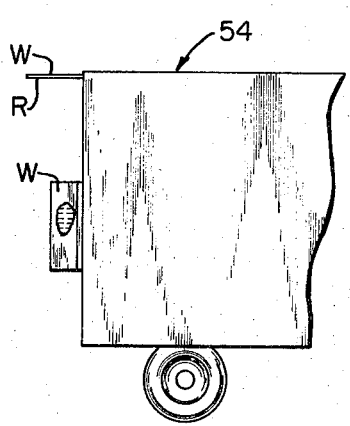
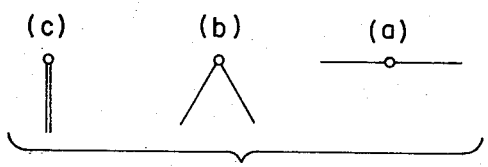

3,832,968

VEHICLE SIGNAL

BACKGROUND OF THE INVENTION

During the early development of the automobile, when automobiles were sparsely disposed along roads and also speeds were relatively low, little need existed for a driver of a leading vehicle to warn the driver of a trailing vehicle that he was reducing his speed or intended to bring his vehicle to a stop. Red tail lights were employed for night driving during the early development of the automobile but these indicated only the presence of a vehicle ahead, rather than the intention of a leading driver to make a change in its maneuvers. As congestion of automobiles increased, the need arose for the type of warning referred to and became compulsory in most localities. One of the early requirements was that the driver extend his arm in suitable manner to indicate a right turn, left turn or a reduction of speed. Such signals became quite standardized throughout the various states so that all drivers recognized their meanings. While such signals were reasonably effective for daylight driving, they were of questionable merit for night driving when it was necessary to view same in the illumination of the headlights of a trailing driver. During this era the stop light evolved, first as an accessory to the automobile and later as standard equipment. Later, right and left turn signal lights evolved and the several signal lights referred to replaced the arm signals previously employed. Such signal lights, which are now standard equipment, have the additional advantage in that it is now unnecessary to roll down a window of a car in order to provide the requisite signal.

Present stop lights are incorporated in pairs of tail lights which remain at constant illumination. When the brake pedal is depressed another light bulb is energized in each tail light. This increase in tail light illumination is the signal that the driver is slowing or intends to stop.

The difficulty with the present system, just referred to, is that the trailing driver is not certain of the meaning of the "stop" light. For example, the driver ahead may have depressed the brake pedal a slight amount, actuating the stop light switch but without applying pressure to the pedal sufficient to actuate the brakes. While this may be unintentional it conveys an erroneous signal to the trailing driver who responds by unnecessarily applying his brakes which, in turn, may produce a chain reaction to the various drivers behind, particularly, if they are closely spaced and moving at relative high speed on a highway. A multiple collision sometimes occurs as a result of such erroneous signal.

The prudent driver, particularly when driving on a freeway at constant speed, usually maintains a "stand-off" distance behind the driver ahead sufficient to slow up or come to a stop within the stand-off distance and without colliding with the vehicle ahead. He has no control, however, over the driver behind him. He is thus caught in the middle and must react in such manner to prevent a collision at both ends of his vehicle. The present stop light referred to does not always convey the requisite signal for the trailing driver to properly react in time and prevent a collision.

Certain accessory signals have been proposed for use on vehicles which are operable in response to aerodynamic forces, as exemplified by U.S. Pat. Nos. 1,798,052; 3,320,920; 3,374,763 and 3,686,938, which provide signals other than the present invention, as will subsequently become apparent.

SUMMARY OF THE INVENTION

The present invention supplements the "stop" signal of a leading driver by causing a visible vane on his vehicle to move in a certain manner, responsive to vehicle speed, and irrespective of the brake pedal signal, and operable automatically beyond his manual control. For simplicity, it is preferably operated by aerodynamic forces to its safe or non-warning position when the vehicle is traveling at a sufficient speed to minimize a hazardous condition and move to a warning position, in response to reduction in vehicle speed, where it signals the existence of a hazardous condition. A resilient device, such as a spring, may be employed to move the vane in opposition to the aerodynamic forces. In its most simplified form a single swingable horizontal or vertical vane may be employed. In a more refined form a pair of vanes, swingable about a common axis, may be employed wherein the legs of a V move between abutting relation and a planar portion perpendicular to the abutting position. In the planar position the warning signal is visible to the trailing driver whereas in the safe or non-warning abutting position the signal is invisible to the trailing driver.

A principal object of the invention, in accordance with the foregoing, is to provide an accessory warning signal for a leading vehicle which automatically signals to the driver of a trailing vehicle whether or not the leading vehicle is traveling at a relatively low hazardous speed or a greater and non-hazardous speed.

Another object is to provide a signal in the form of a swingable vane which changes in effective viewed area, the rate of change of which area is a measure of the rate of change, or deceleration, of the leading vehicle.

A further object is to provide a signal, which by the selection of suitable resilient means, may be adjusted to provide desired signal information at desired vehicle speeds.

A further object is to provide a signal in the form of a pair of vanes pivoted about a common axis, which are disposed in abutting relation, when closed at non-hazardous speed and swing in opposite direction to open planar relationship at hazardous speed.

Further objects in accordance with the foregoing object, are to support the vanes in such manner that each may swing independent of the other or be mechanically coupled so that they conjointly swing dependent upon each other.

Still further objects, advantages, and salient features will become more apparent from the subsequent detailed description, the appended claims, and the accompanying drawings to now be briefly described.

BRIEF DESCRIPTION OF THE DRAWINGS

FIG. 1 is a rear elevation of one form of the subject invention;

FIG. 1A is a like view with parts in a different position;

FIG. 2 is a top plan as viewed in the direction of arrow 2, FIG. 1;

FIG. 3 is an enlarged section taken on line 3—3, FIG. 1;

FIG. 4 is an enlarged section taken on line 4—4, FIG. 1;

FIG. 5 is an enlarged rear elevation of a detail as viewed in the direction of arrow 5, FIG. 2;

FIG. 6 is a side elevation of another form of the invention;

FIG. 7 is an enlarged section taken on line 7—7, FIG. 6;

FIG. 8 is an enlarged elevation as viewed in the direction of either arrow 8, FIG. 6;

FIG. 9 is a side elevation, like FIG. 6, of another form of the invention;

FIG. 10 is an enlarged section taken on line 10—10, FIG. 9;

FIG. 11 is a section taken on line 11—11, FIG. 10;

FIG. 12 is a rear elevation of a truck employing the subject invention;

FIG. 13 is a side elevation of FIG. 12 as viewed in the direction of arrow 13, FIG. 12; and FIG. 14 illustrates different vane positions.

DETAILED DESCRIPTION OF PREFERRED EMBODIMENTS

Referring now to the drawings, and first to FIGS. 1-5, signal 10 comprises a pair of flat arms or vanes 12, 12a, inner ends of which are pivotally mounted on a shaft or pintle 14, such as by hinges 16. A spring 18, illustrated as of the torsion type, is mounted on the shaft and has free ends engaging the vanes, as best shown in FIG. 5, for urging the vanes toward their aligned or planar position, as best shown in FIGS. 1 and 2. A stop 20, secured to the shaft, limits swinging movement of the vanes to their open or planar position, also best shown in FIGS. 1 and 2. The vanes are free to swing rearwardly 90° to their abutting or closed positions as indicated by the dotted lines, FIG. 2, at which positions they appear, from the rear, as illustrated in FIG. 1A. The rear faces of the vanes, as viewed in FIGS. 1 and 2, are colored red or other suitable color which represents a hazardous condition. Shaft 14 may be attached to vehicle top 22 in any suitable manner, preferably on the central longitudinal axis thereof. As illustrated, this comprises a ball 24 at the lower end of shaft 14 which seats in a like socket in a vacuum cap 26, as best shown in FIG. 4, and locked thereto in suitable position, such as by a set screw 28. Since passenger automotive vehicle tops are generally curved, the ball and socket construction permits the shaft to be adjusted to a vertical position. When the leading vehicle, to which the signal is attached, is stationary, the driver of the trailing vehicle will view the signal as illustrated in FIG. 1. When the leading vehicle is moving above a predetermined speed, aerodynamic forces on the vanes move them to abutting closed position which appear to the trailing driver as illustrated in FIG. 1A, which constitutes a signal of a non-hazardous condition. Intermediate positions of the vanes, between open and closed positions, provide other signal information which will subsequently be described.

In the construction so far described, the vanes will move to the positions shown in FIG. 1A provided the vehicle is moving through still air or through a head or tail wind aligned with the direction of vehicle movement. This is because the vanes may swing independently and the aerodynamic forces on the vanes are the same. If a uniform velocity cross wind were encountered, however, the vanes would still be in abutting closed relationship but their common plane would be rotated somewhat from the direction of travel, depending upon the magnitude and direction of the cross wind. The trailing driver does not, of course, see the warning surfaces of the vanes but may see the component area of a front surface of one of the vanes, which may be of a different color, such as white. Otherwise stated, instead of seeing only the rear edges of the vanes (if seen at all) he may see a band of white of considerably less width than the length of the vanes. This is not objectionable since any color viewed, other than the hazardous color, represents a non-hazardous condition. If it is desired to always move the vanes to alignment with the direction of vehicle travel, as illustrated in FIG. 1A, when a cross wind may be encountered, this may be attained by a refinement to now be described.

The construction of FIGS. 6-8 differs principally from the previous Figs. in that a pair of parallel shafts 30, 30a carry vanes 32, 32a, the upper and lower ends of the shafts being journaled in the upper and lower horizontal legs of a rectangular frame 34 which surrounds the vanes when they are in closed abutting positions. Like meshing gears 36, 36a are also secured to the respective shafts which constrain the two vanes to move in unison in equal and opposite direction. As will be apparent, when the vanes swing 90° from their open positions they abut and each forms a stop for the other, the vanes then being aligned with the direction of vehicle movement and irrespective of direction of magnitude of a cross wind. Extensible coil springs 38, 38 are provided for returning the vanes to aligned planar position, serving the same purpose as spring 18 in FIGS. 1-5. Frame 34 may be secured to the vehicle top 22 in any suitable manner. As illustrated, a pair of leaf hings 40, 40 are provided, each secured to a vertical leg of the frame by a slot and screw connection 42. As will be apparent, one leaf of each spring may be adjusted to conform to the curvature of the top and the other providing a vertical adjustment so that shafts 30, 30a may be adjusted to vertical positions.

FIGS. 9-11 illustrate a construction like that of FIGS. 6-8 with the principal difference residing in the gears 44, 44 which connect shafts 30, 30a. These gears, instead of being substantially the vertical width of the vanes as in FIGS. 6-8, are narrow in width as best shown in FIG. 11. Also, one of shafts 30 is journaled at each of its end in a slot 46, disposed in the upper and lower legs of the frame. This construction is to prevent gear damage in case of a forced closure. The gear system also allows out of mesh over-ride in order to realign. An extensible coil spring 50, extending partially around shafts 30, 30a, and connected at its ends to the two vanes, serves to move same to their open positions in the same manner as other like springs previously described. A cantilevered spring 52, having an end engaging shaft 30, may be employed for moving the shaft to one end of slot 46 at which the gears are fully meshed, as best shown in FIGS. 10 and 11. Normally, only one slot 46 and the adjacent spring 52 will be required since the other end of shaft 30 may be provided with slight clearance in the frame to permit shaft 30 to swing away from shaft 30a to permit disengagement of the gears.

FIGS. 12 and 13 illustrate an alternative form of the invention, particularly applicable to a truck or trailer 54, wherein the only clear view of the vehicle, to a trailing driver, is the rear end thereof. This, of course, is therefor the logical position of a warning device, as distinguished from a passenger vehicle wherein some latitude of positioning of a warning device is feasible. In this application, a vane, its pivotal support, and its return spring may be as previously described but only one vane, swingable through 90°, is employed, rather than a pair of vanes as employed in FIGS. 1–11. Preferably, a vane is disposed adjacent each vertical rear side corner of the vehicle, and optionally, another like vane may be employed adjacent the rear horizontal top corner of the vehicle. FIG. 12 illustrates the picture presented to the trailing driver when the vehicle is at rest or moving below a predetermined speed. During this condition, the return springs have moved the vanes to the position wherein each appears red to the trailing driver, as illustrated in FIG. 12. When the vehicle is moving above a non-hazardous speed, aerodynamic forces move each vane to a position 90° to its former position as illustrated in FIG. 13. As will be apparent, the trailing driver now sees only the edges of the vanes, rather than the warning surfaces thereof.

As so far described, it has been suggested that the vanes (or a single vane as in FIGS. 12 and 13) are either fully "open" or fully "closed." This is somewhat of an over-simplification of the mode of operation since a discrete "range" of speed will generally be required to effectuate movement of a vane between its opposite limit positions of movement. FIG. 14 illustrates this wherein:

a. illustrates the fully open position when the vehicle is moving below a predetermined speed;
b. illustrates one of various positions between speeds wherein the vanes are fully closed and fully open; and
c. illustrates a fully closed position when the vehicle is moving above a predetermined speed.

As an example, suppose that it is desired to maintain the vanes fully open at speeds below 20 mph and fully closed at speeds above 30 mph. Let it also be assumed that the vehicle is moving through still ambient air. The force tending to close the vane is then proportional (not necessarily directly proportional) to vehicle speed and the force tending to open it is proportional to the spring urge, (which is independent of vehicle speed). A spring may then be chosen, taking into consideration the aerodynamic forces, which will maintain the vane in one of the other of its limit positions. Let it now be assumed that the vehicle is moving at 25 mph. It is apparent that the vane is in an intermediate position, as depicted in FIG. 14(b). Let it also be assumed that the trailing driver understands that when the signal is fully open the vehicle is moving below 20 mph, when fully closed it is moving more than 30 mph, when partially open it is moving somewhere between 20 and 30 mph. The latter provides some information to the trailing driver as to the speed of the vehicle ahead of him but it usually is not the more critical information with which he is concerned. When the vehicle is known to be moving at constant speed, he merely adjusts his speed accordingly to prevent a hazardous condition. Let it now be assumed, however, that the trailing driver observes a rapid change between fully closed to fully open positions. For example, it is fully closed and a second or so later it is fully open. This conveys the more important information that the leading vehicle is decelerating at a high rate, such as a panic braking of the leading vehicle. This, as will be apparent, creates a hazardous condition to which the trailing driver must quickly respond to avoid a collision.

The 20–30 mph range, taken as an example, is a practical one for overall driving. In city driving, for example, where maximum speed may not exceed 30 mph, a sudden change to 20 mph constitutes a dangerous hazard, particularly where vehicles are closely spaced. At 60 mph on a highway the signal would not respond to a change to, say, 50 mph; at such speeds, however, this is less critical since in this type of driving greater caution is generally exercised, particularly by maintaining car stand-off sufficient to adequately react when the stand-off distance rapidly decreases. Otherwise stated in this example, the rate of change of stand-off distance becomes a parameter of deceleration of a leading vehicle. In the former example, the rate of change of the signal from full closed to full open is also a measure of deceleration. In either case, the ability of the human mind to approximately measure short durations of time becomes a parameter to determine the acceleration derivity of $ds/dt$.

If, say, a 10 mph differential is chosen between full open and full closed positions of the signal, it presently appears, accordingly, that the choice should favor the lower speeds which include city driving rather than highway speeds.

I claim:

1. In a signal for use on a first vehicle for conveying information to the driver of a second vehicle traveling behind the first vehicle, comprising:
   a. a signal vane having a first face with warning indicia thereon, such as red, indicating that the first vehicle is traveling below a predetermined speed range or is stationary,
   b. means for pivotally mounting said vane to the first vehicle for swinging movement between a first closed position in which it is aligned with the direction of travel of the first vehicle and in which closed position said face is invisible to the driver of the second vehicle, to a second open position transverse to the direction of travel of the first vehicle in which open position said face is fully visible to the driver of the second vehicle,
   c. resilient means for urging said vane to said open position when the first vehicle is traveling below said predetermined speed range, whereby the warning indicia thereon becomes completely visible to the driver of the second vehicle,
   d. the vane being movable to said closed position by aerodynamic forces acting thereon when the first vehicle is traveling above said predetermined speed range to thereby render the warning indicia invisible to the driver of the second vehicle.

2. A signal in accordance with claim 1 wherein the vane is pivotally mounted at or near its forward end to the first vehicle, whereby substantially all of the aerodynamic forces acting on the vane are effective to produce the maximum moment on the vane to urge it toward its first position.

3. A signal in accordance with claim 2 including a second like vane pivotally mounted adjacent the first named vane adapted to swing in a direction opposite to the first named vane, whereby the planes of the two vanes may be disposed in adjacent parallel planes or may be disposed substantially in a single plane.

4. A signal in accordance with claim 3 wherein the two vanes are mechanically coupled together for positive conjoint movement in opposite directions.

5. A signal in accordance with claim 4 wherein the vanes are supported by parallel spaced shafts, and a gear on each shaft meshing with the gear on the other shaft.

6. A signal in accordance with claim 5 wherein one of the shafts with the gear thereon is mounted in such manner that it may move away from the other shaft and permit the gears to disengage, whereby one vane may swing in event the other vane is obstructed against swinging movement.

7. A signal in accordance with claim 3 including a frame, open at opposite sides thereof, and extending about edges of the vanes, when disposed in their juxtaposed first positions, for protecting the vanes against engagement with objects in the path thereof, and means for securing the frame to the first vehicle.

8. A signal in accordance with claim 7 including means for adjusting the position of the frame and vanes relative to the first vehicle.

9. A signal in accordance with claim 1, and means for securing same to the rear end of a truck or trailer vehicle adjacent an outer vertical face thereof, whereby it may swing between a position aligned with the airstream passing along said face when the vehicle is moving above a predetermined speed range or more to a transverse position when the vehicle is moving below a predetermined speed range.

10. A signal in accordance with claim 9, including a second like signal adapted to be secured to the vehicle adjacent a second like opposite vertical face of the vehicle.

11. A signal in accordance with claim 10 including a third like signal adapted to be secured to the vehicle adjacent the top face thereof.

12. A signal in accordance with claim 1, including a suction cup for securing same to the top of the first vehicle.

13. A signal in accordance with claim 1 wherein said vane is adapted to move to various intermediate positions, between open and closed positions, when the first vehicle is moving at speeds within said speed range, the operation being such that the viewed area of said first face is maximum when viewed in a direction normal to the plane thereof, the viewed area is zero when viewed in a direction parallel to the plane thereof, and is of an intermediate area, between maximum and zero, when viewed in a direction at an acute angle to the plane thereof, whereby the rate of change of the viewed area, from maximum toward zero is a measure of deceleration of the first vehicle, to thereby convey to the driver of the trailing vehicle information for maneuvering his vehicle in accordance with the deceleration.

14. A signal in accordance with claim 13 including a second like vane pivotally mounted adjacent the first-named vane adapted to swing in a direction opposite to the first vane, whereby the planes of the two vanes may be disposed in adjacent parallel planes or may be disposed substantially in a single plane.

15. A signal in accordance with claim 1 wherein the opposite face of said vane is provided with second caution indicia thereon, such as white, and is so movable on the first vehicle that said second indicia is never visible to the driver of the second vehicle, but may be visible to a driver of a third vehicle approaching the first vehicle in a direction transverse thereto, when the first vehicle is traveling at a speed above said speed range.

16. A signal in accordance with claim 3 wherein the opposite faces of both vanes are provided with second caution indicia thereon, such as white, and are so movable on the first vehicle that the second indicia thereon is never visible to the driver of the second vehicle, but may be visible to drivers of other vehicles approaching the first vehicle in a direction traverse thereto, and in either direction of approach, when the first vehicle is traveling at a speed above said speed range.

* * * * *